United States Patent [19]

Remmers

[11] 4,431,959
[45] Feb. 14, 1984

[54] REGULATOR FOR CHARGING A BATTERY WITH A PERMANENT MAGNET ALTERNATOR

[75] Inventor: Gregry M. Remmers, Ingleside, Ill.

[73] Assignee: Outboard Marine Corporation, Waukegan, Ill.

[21] Appl. No.: 412,117

[22] Filed: Aug. 27, 1982

[51] Int. Cl.³ .............................................. H02J 7/00
[52] U.S. Cl. ...................................... 320/59; 320/22; 320/39; 320/61
[58] Field of Search ...................... 320/57, 59, 61, 39, 320/40, 22; 322/94; 363/85, 88, 128

[56] References Cited

U.S. PATENT DOCUMENTS 3,808,514 4/1974 Wesemeyer ...................... 320/59 X
4,035,709 7/1977 Seider et al. ...................... 320/39 X
4,161,022 7/1979 Kanazawa et al. .................. 363/88

FOREIGN PATENT DOCUMENTS 593206 2/1978 U.S.S.R. .............................. 363/128

*Primary Examiner*—William M. Shoop
*Attorney, Agent, or Firm*—Michael, Best & Friedrich

[57] ABSTRACT

A battery to be charged is connected to the stator winding output terminals of a permanent magnet alternator by way of two half-wave rectifier circuits. Each rectifier circuit has at least one controlled rectifier in series with the battery. The controlled rectifiers have gate terminals, respectively, for supplying a signal that renders them conductive. A semiconductor isolating or shut off switch, preferably a transistor switch, connects the battery terminal to a voltage divider circuit that develops two discrete voltage levels that are proportional to battery voltage. A zener diode circuit fed from the battery provides a stable reference voltage. A first comparator compares one of the voltages that corresponds with the battery voltage being a predetermined amount below full-charge condition with the zener reference voltage and if the reference voltage is exceeded, the comparator trips to turn on one of the SCR diode rectifiers for charging the battery at a relatively low rate with half-wave rectified dc. A second comparator compares a still lower voltage in the divider with the zener reference voltage and trips to effect turning on the other SCR diode to charge the battery additionally to the other SCR and the half-wave rectifier circuit in which it is connected. Thus, full wave charging occurs. If the battery is accidentally disconnected high voltage could develop on the alternator terminals. Disconnection turns off the isolating transistor and the controlled rectifiers lose their gating signals and turn off. High voltage across the alternator during the last half of the cycle before turn off is dissipated to ground by a zener diode.

6 Claims, 2 Drawing Figures

REGULATOR FOR CHARGING A BATTERY WITH A PERMANENT MAGNET ALTERNATOR

BACKGROUND OF THE INVENTION

This invention relates to a regulator for regulating charging of a battery from the alternating current output terminals of a permanent magnet alternator such as one that is driven by the engine of a vehicle or boat.

As is well known, the alternating output voltage and output current from a permanent magnet alternator are directly related to the rotational speed of the alternator and, hence, to the speed at which the engine is running. When a permanent magnet alternator is used to charge a storage battery, a regulator must be used to limit the current delivered to the battery to avoid overcharging. Since the field flux of a permanent magnet alternator is constant and not easily changed, the output circuit that is connected to the alternator stator winding must be opened or short circuited to regulate the voltage rather than by varying field excitation current as is possible in wound rotor alternators.

Short circuiting of the output of the alternator to achieve regulation of the voltage that is applied to the battery for charging it has several disadvantages. One is that the alternating windings tend to overheat under short circuit conditions as a result of the heavy current flow. Another is that the alternator ac output signal is lost which in many instances is used for other purposes such as providing pulses to a tachometer circuit. There are numerous prior patents that disclose regulators which regulate voltage by shunting or short circuiting the alternator.

A method that is preferred over shunting the alternator output is to charge the battery from the alternator output through a diode or rectifier bridge wherein thyristor switches such as silicon controlled rectifiers (SCRs) are used in the legs of the bridge. Generally, if a half wave rectifier is used, an SCR will be connected in a single series circuit with the battery and if the circuit is for full wave rectification, there will be an SCR in alternate legs of the full wave rectifier bridge. Means are typically provided for sensing battery voltage. When a voltage below full charge level is sensed, the SCRs are gated on and charging current is delivered to the battery until fully charged voltage is sensed in which case the gating signal is removed from the SCRs and no further charging current flows. These regulators depend on the terminal voltage of the battery dropping below some fixed level before any charging begins. They are incapable of providing a low charging rate when battery voltage is just slightly below fully charged voltage and charging at a high rate when battery terminal voltage is substantially below that which corresponds to fully charged condition.

U.S. Pat. Nos. 3,857,082 and 4,146,831 typify the use of full-wave bridge rectifiers for charging a battery from the output terminals of a permanent magnet alternator. In both cases, the rectifying diode in two of the legs of the bridge consists of an SCR that provides a gate terminal. Transistor circuits are used for sensing battery voltage and responding to battery voltage dropping down to a particular level by gating the SCRs on to charge the battery with full-wave dc. When fully charged battery voltage is sensed, the SCRs are turned off and the flow of charging current to the battery is completely interrupted. This is amply demonstrated in FIG. 6 of U.S. Pat. No. 3,857,082 and in FIG. 1 of U.S. Pat. No. 4,146,831.

SUMMARY OF THE INVENTION

In accordance with the invention, a plurality of battery charging rates are obtained by charging the battery with half-wave dc or full-wave rectified dc depending upon the state of charge of the battery.

In accordance with the invention, first and second half-wave rectifier circuit means are connected to form a full-wave rectifier bridge. Means for sensing a voltage corresponding to the terminal voltage of the battery are provided. There are means responding to the sensing means sensing a voltage that is a predetermined amount lower than the fully charged terminal voltage of the battery by connecting the first half-wave rectifier circuit means in a series circuit between the alternator output terminals for charging the battery at one rate with half-wave dc and responding to sensing a voltage that is an additional predetermined amount lower by connecting said second half-wave rectifier circuit means in another series circuit between the alternator output terminals for charging the battery with full-wave dc in conjunction with the first half-wave rectifier circuit means. Preferably controlled rectifiers are used to connect and disconnect the battery to and from the alternator.

Further in accordance with the invention, means are provided for preventing the alternator voltage from rising to an undesirably high level when the battery is disconnected such that the alternator would be unloaded and open-circuited. The battery voltage sensing and regulating circuit is supplied through a transistor switch which is fed from the battery. When the battery disconnects controlled rectifier conduction stops after the first half-cycle. Voltage prevailing during the last conductive half-cycle is shunted to ground through a zener diode that breaks down when it is subjected to slightly higher than battery voltage at fully charged condition.

Further, in accordance with the invention, at those times that both rectifier circuits are turned off, there is still available an alternating current signal from the alternator that can be subjected to half-wave rectification and pulse squaring to drive a tachometer.

Another feature of the invention is that the regulator circuit, apart from the rectifier and battery charging circuit, is supplied from the battery through a transistor switch which is conductive when the key switch for the engine ignition is turned on and is nonconductive when the engine is off such that there is no battery current consumption or drain by the regulator except when the engine is running.

How the foregoing and other more specific objects of the invention are achieved will be evident in the more detailed description of a preferred embodiment of the invention which will now be set forth in reference to the drawing.

DESCRIPTION OF A PREFERRED EMBODIMENT

Figure 1:
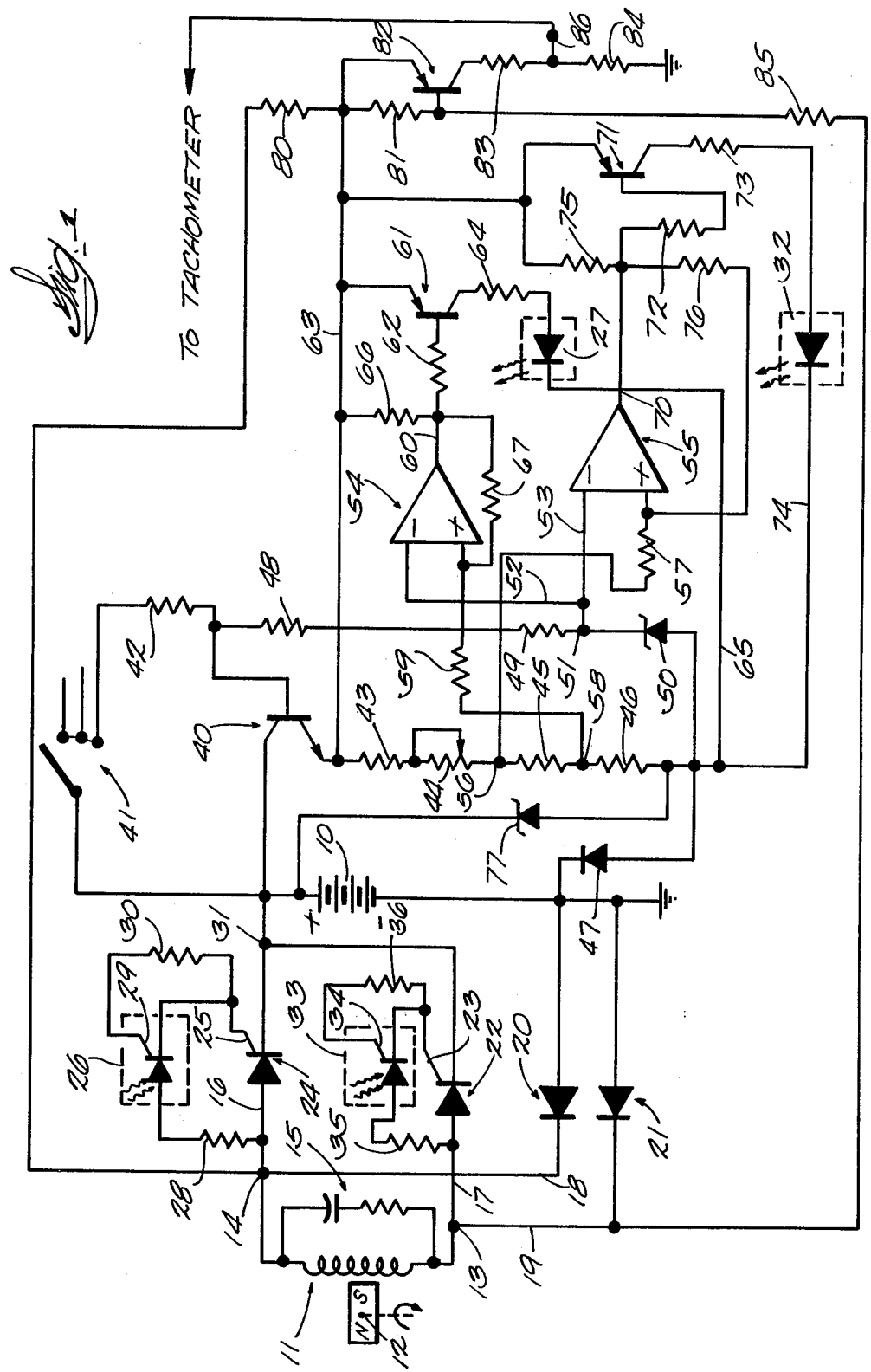
FIG. 1 is a schematic diagram of one embodiment of the new regulator for charging a battery from a permanent magnet alternator.

In the FIG. 1, the battery that is to be charged up to rated terminal voltage is marked 10. The permanent magnet alternator for generating the charging current is generally identified by the numeral 11. The permanent magnet rotor 12 of the alternator is understood to be driven rotationally by an internal combustion engine, not shown, for example. Opposite ends of the alternator stator winding lead to the alternator output terminals 13 and 14. An RC filter circuit 15 is shunted across the alternator output terminals.

The battery charging circuit is basically a full-wave bridge rectifier composed of four rectifier means but is unique in the respect that, under the control of the new regulator circuit which will be described, the bridge is controllable to cause battery charging with half-wave dc when sensed battery terminal voltage is only slightly below rated voltage at which time charging current demand is low and to cause battery charging with full-wave dc when sensed battery terminal voltage falls substantially below rated voltage at which time charging current demand is high. The ac output lines from the alternator to the rectifier bridge are marked 16 and 17. The dc return lines are marked 18 and 19. Two of the four previously mentioned rectifier means are ordinary diodes 20 and 21. The other two rectifier means are comprised of thyristor switches, particularly in this embodiment, silicon controlled rectifiers (SCRs) one of which, 22, has its gate terminal marked 23 and the other 24 of which has its gate terminal marked 25. The series circuit beginning at alternator output terminal 14 and continuing through SCR 24, battery 10, diode 21, line 19 and back to alternator output terminal 13 constitutes one half-wave dc rectifier circuit means. The series circuit beginning at output terminal 13 and continuing through SCR 22, battery 10, diode 20, line 18 and back to alternator output terminal 14 constitutes the other half-wave dc charging circuit. The term "controlled rectifier" is used herein as a generic designation of any rectifying or unidirectionally conducting semiconductor device or thyristor that is subject to gating. The polarity of the battery terminals are indicated by the plus and minus signs.

Means for providing gate signals selectively to the gates of SCRs 22 and 24 to enable SCR 24 to conduct and supply half-wave dc charging current to battery 10 or alternately, to enable both SCR 24 and SCR 22 to conduct and supply full-wave dc charging current comprise light-activated silicon controlled rectifier (LASCR) switching circuits in the illustrated preferred embodiment. The LASCR for gating SCR 24 to a conductive state is in the dashed line box marked 26. LASCR 26 is optically coupled to a light-emitting diode (LED) which is in a dashed line box 27 appearing in the right region of the drawing. The anode of LASCR 26 is connected through a current limiting resistor 28 to ac output terminal 14 of the alternator. Its cathode is connected to gate terminal 25 of SCR 24. Whenever LASCR 26 is activated or made conductive by light from LED 27 and while output terminal 14 of the alternator is in the positive half of its alternating cycle, a gate signal is applied through LASCR 26 to gate terminal 25 of SCR 24. Hence, SCR 24 conducts the half-wave dc charging current to battery 10 as long as LED 27 is emitting light. The gate terminal 29 of LASCR 26 is in series with a resistor 30 for the voltage drop for this circuit to sustain conduction of the LASCR once it has started.

Thus, when other components of the regulator circuit yet to be described sense that battery terminal voltage is below fully charged condition by a predetermined amount, LED 27 is turned on and SCR 24 is turned on or enabled to conduct. When alternator terminal 14 goes positive, half-wave dc charging current flows from alternator terminal 14 through SCR 24 to the rectifier bridge dc output terminal 31 and then through battery 10, rectifier diode 21, line 19 and back to the presently negative alternator terminal 13.

SCR 22 in the other half-wave charging circuit is made conductive along with SCR 24 to charge the battery in the full-wave dc mode when, in accordance with a feature of the invention, the regulator circuit senses that the battery terminal voltage is below the aforesaid predetermined amount by another predetermined amount below full-charged level. Under this condition, another LED 32 in the dashed line box having that numeral in the right region of the diagram is turned on concurrently with LED 27. When LED 32 emits, LASCR 33 associated with SCR 22 is enabled to supply gate signals to the gate terminal 23 of SCR 22 so it will conduct when ac output terminal 13 of the alternator goes through positive-half cycles. During these half cycles, charging current flows from alternator output terminal 13 through SCR 22 to rectifier circuit output terminal 31 and then through battery 10, diode 20 and line 18 to the then negative alternator terminal 14. LASCR 33 has a gate terminal 34, a current limiting resistor 35 and a resistor 36 associated with it and these elements function in respect to SCR 22 in the same way that resistor 28, gate 29 and resistor 30 cooperate with SCR 24 as previously discussed.

Now to be discussed is the regulator circuit including the means for detecting one and the other of the aforementioned predetermined voltage levels, means for comparing these voltage levels with the reference voltage, means responding to the first comparison being made by activating one of the half-wave rectifier circuit means and means responsive to a comparison of the second voltage being made by activating the other half-wave rectifier circuit to effect high-rate charging of the battery 10 with full-wave rectified dc.

The regulator circuit comprises a semiconductor switch in the form of a transistor 40 which is used to isolate or prevent current flow into the regulator circuitry and thus eliminate unnecessary drain of battery 10 when the engine is not running and the alternator is not generating. The collector of transistor 40 is connected to to the positive terminal of battery 10 but there is no base-emitter bias current for switching transistor 40 on or to a conductive state until the key switch 41 on the vehicle or boat is closed for starting the engine that drives the alternator. Closing key switch 41 supplies battery power to the various devices on the vehicle or boat and also permits bias current for transistor 40 to flow through resistor 42 and the base-emitter circuit of the transistor for making it conductive and putting its emitter at substantially battery potential. There is a voltage divider circuit connected between the emitter of transistor 40 and ground by way of diode 47. The divider circuit is comprised of resistor 43, adjustable resistor 44 and resistors 45 and 46. Besides connecting the bottom end of resistor 46 to ground, diode 47 blocks reverse current flow into the regulator circuitry which might otherwise occur if the battery were erroneously installed with its polarity reversed.

When transistor 40 is turned on by applying biasing current through key switch 41 and resistor 42, current flows through divider resistors 43-46 and diode 47 to ground. The voltage drops of interest in this circuit occur at junction 58 on the top of resistor 46 and at junction 56 on the top of resistor 45. Current and, hence, the level of the voltage drops at junctions 56 and 58 is set by adjusting resistor 44. In any event, the voltages at junctions 56 and 58 are proportional to the voltage across the terminals of the battery. When the key switch is turned on, current also flows through a series reference voltage circuit supplied through resistor 42 and comprised of resistors 48 and 49 and a zener diode 50 whose anode is connected to ground through diode 47. Zener diode 50 provides a stable reference voltage at the junction point 51. In an actual embodiment, by way of example and not limitation, a zener diode 50 is used which breaks down at about 5.2 volts in a case where the rated full-charge voltage of battery 10 is 14.5 volts. By way of lines 52 and 53 the reference voltage at junction 51 is applied to the inverting inputs of two operational amplifiers used as comparators 54 and 55. The voltage at junction point 56 at the top of resistor 45 in the divider circuit is applied to the non-inverting input of comparator 55 through input resistor 57. The voltage at junction point 58 at the top of divider resistor 46 is applied to the non-inverting input of comparator 54 through an input resistor 59. Since the voltages at junctions 56 and 58 in the divider circuit are proportional to the terminal voltage of battery 10 two voltages corresponding to two different states of battery undercharge can be detected or sensed. The comparators 54 and 55 constitute means for comparing the two different voltage levels that are representative of battery voltage with the stable zener diode 50 reference voltage.

In the illustrated embodiment, when the battery is in or near fully charged condition, the voltages at junctions 56 and 58 are below the zener reference voltage and the output terminals 60 and 70 of comparators 54 and 55 are at their high voltage or high input impedance state. Then, for example, when the voltage at junction 58 in the divider circuit drops below the zener diode 50 reference voltage threshold, indicating that the battery needs charging current, comparator 54 trips and its output 60 switches to its low impedance state in which it can sink current. The base of a transistor 61 is connected to comparator output 60 through a resistor 62. The emitter of transistor 61 connects to a line 63 to which battery voltage is applied through regulator circuitry isolating switching transistor 40. Whenever emitter bias current is sinked by output terminal 60 of comparator 54, transistor 61 switches to a conductive state and current flows through transistor 61, current limiting resistor 64, LED 27, line 65 and diode 47 to ground, thus causing LED 27 to emit light continuously as long as the voltage detected or sensed at junction 58 is below the zener diode reference voltage and does not correspond to battery 10 being fully charged. As explained earlier, when LED 27 is emitting light, LASCR 29 is rendered conductive or activated to provide a gate signal to gate terminal 25 of SCR 24. Hence, during every half-wave when alternator terminal 14 goes positive and SCR 24 is forward biased and concurrently having a gate signal applied, SCR 24 conducts and supplies half-wave dc to battery 10. Thus, when the battery voltage is below fully-charged voltage by first predetermined amount, the battery is being charged with half-wave rectified dc at the lower of two available charging rates which is desirable when the battery is only slightly undercharged.

It may be noted that there is a pull-up resistor 66 connected between positive line 63 and the output 60 of comparator 54 and there is a feedback resistor 57 connected between the output and noninverting input to control hysteresis of the comparator.

Now if the battery voltage falls substantially below full-charge level by a second predetermined amount in addition to the first predetermined amount, such that the voltage at junction 56 at the top of resistor 45 in the divider circuit drops below the zener diode 50 reference voltage threshold, the comparator 55 responds by switching its output 70 to a low impedance state for sinking current. When output 70 can sink current, bias current flows from line 63 through the emitter base circuit of another transistor 71 whose base current limiting resistor 72 connects to the current sinking output of comparator 55. This renders transistor 71 conductive for conducting current from line 63 through a resistor 73 and the second LED 32 whose cathode is connected to ground by way of line 74 and diode 47. When LED 32 is emitting light, LASCR 33 is activated for conducting gating signals to gate terminal 23 of the previously nonconducting SCR 22. With the gating signal applied to its gate terminal, SCR 22 will conduct during alternating half-cycles when output terminal 13 of the alternator goes positive. With SCRs 24 and 22 conducting alternate halves of the ac cycles from the alternator, full-wave dc charging of battery 10 takes place and more energy is supplied to the battery to bring it up more rapidly to at least the terminal voltage where the regulator determines that the lower half-wave charging rate should be restored. Of course, when the battery regains charge and when its voltage begins to go up again, comparator 55 will trip and turn off LED 32. This causes SCR 22 to stop conducting while SCR 24 continues to conduct half-wave dc charging current. When the battery voltage increases by another increment indicative of it approaching fully-charged condition, comparator 54 will trip and cause LED 27 to turn off in which case SCR 24 switches to its nonconductive state so all charging current to the battery is discontinued.

It may be noted also that there is a pull-up resistor 75 connected to the output of comparator 55 and a feedback resistor connected between its input and output. They serve the same purposes as resistor 66 and 67 associated with comparator 54 and need not be discussed again.

When key switch 41 is opened to stop the engine, the bias and reference circuit including resistors 42, 48 and 49, zener diode 50 and diode 47 are disconnected from the battery so this circuit drains no power. In addition, bias current is removed from transistor 40 so it switches off to prevent battery current drain through divider circuit 43-46 and it removes battery voltage from bus line 63 so that other components of the regulator drain no current from the battery.

One of the problems with prior art permanent magnet alternator battery charging systems is that if a battery terminal loosens or becomes disconnected by accident while the alternator is conducting the voltage at the alternator output terminals can rise to a high value which might damage circuit components. However, as a result of another feature of the invention, the alternator is isolated from the regulator circuitry within one-half of an ac cycle. As the alternator output voltage goes toward zero during the first half cycle after battery disconnection occurs, the base bias voltage to isolating switching transistor 40 falls off since there is no battery voltage supply. This results in transistor 40 switching off during the half cycle and staying off to thereby remove power from all other active circuit components. This action prevents SCR 24 and SCR 22 from being turned on after the first half-cycle since there can be no light signal supplied to the LASCRs 26 and 33. During a half cycle while either SCR 24 or SCR 22 is still conducting following battery disconnection, a zener diode 77 dissipates the energy in the alternator to ground so the alternator output voltage is clamped or held to a tolerable level at all times. Zener diode 77 breaks down at a voltage above fully-charged battery voltage; at about 20 volts, for example.

Alternator ac output voltage frequency is related to present engine rpm so pulses at alternator frequency are available for use in a tachometer, not shown, to provide an indication of engine rpm. The tachometer output circuitry includes a high value resistor 80, resistor 81, a transistor 82 and resistors 83, 84 and 85. Transistor 82 is normally forward-biased by the voltage drop across resistor 81 which is connected to battery voltage supply line 63. Transistor 82 is turned on and dc current flows from line 63 through the transistor and resistors 83 and 85 to ground. When the engine is driving alternator 11, its output terminal 14 goes positive every half cycle, of course. The half-wave pulses are amplified by transistor 82 and each pulse drives the transistor into saturation so square wave pulses are produced at output terminal 86. These square wave pulses have an amplitude substantially equal to battery voltage. The tachometer itself is not shown but it may be a conventional type that integrates the square wave pulses that come out of terminal 36 at a rate corresponding to engine rpm and develops an analog voltage that drives a meter which is calibrated in terms of engine rpm.

Figure 2:
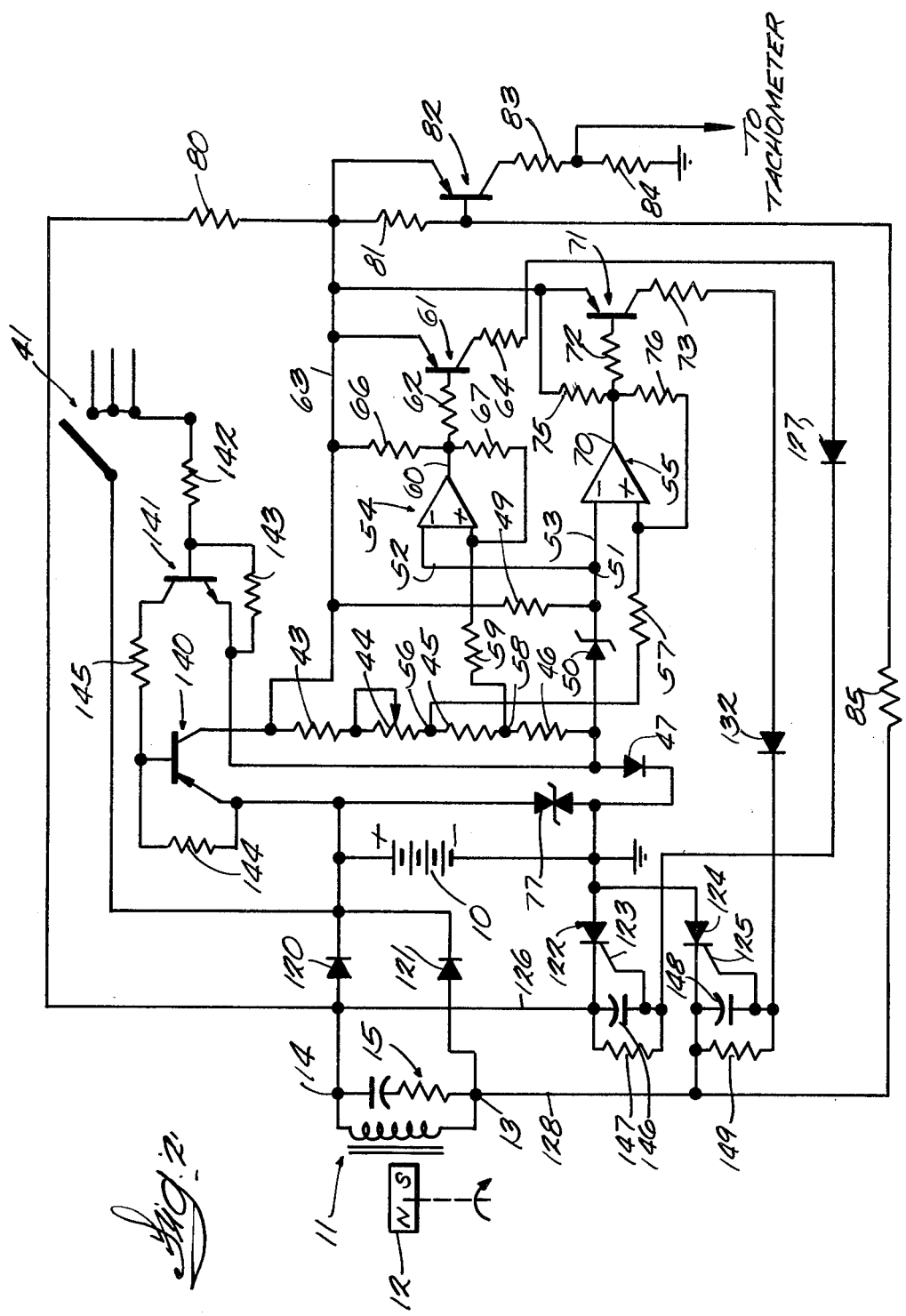
FIG. 2 is a schematic diagram of an alternative embodiment of the battery charger regulator.

An alternative embodiment of the regulator is shown in FIG. 2. This embodiment permits achieving all of the functions of the FIG. 1 embodiment and has the advantage of cost reduction in that the LASCRs 26 and 33 that are used in the FIG. 1 embodiment are eliminated in the FIG. 2 embodiment. Because SCRs 24 and 22 are in the line leading to the positive side of the battery 10 in the FIG. 1 embodiment, the LASCRs had to be used in order to gate on or switch the SCRs successfully. In the FIG. 2 embodiment, the SCRs are in the line leading from the negative side of the battery so they can be gated on directly. In FIG. 2 the SCRs are given reference numerals 122 and 124.

In FIG. 2, components that are identical to those in FIG. 1 are given the same reference numerals. New components are given reference numerals above 100. Components that have counterparts in FIG. 1 but may be relocated are given the reference numeral in FIG. 1 plus 100.

In FIG. 2, a semiconductor switch in the form of a transistor 140 is used for isolating or prevention of current flow into the regulator circuitry to thereby eliminate unnecessary current drain when the engine is not running and the alternator 11 is not generating. The emitter of transistor 140 is connected to the positive terminal of battery 10 and its collector is connected to the top of voltage divider 43-46 to main power line 63 of the regulator. Hence, when transistor 140 is nonconductive, no current can flow in the divider nor in the other regulator circuitry. Transistor 140 is switched on and off by turning transistor 141 on and off. When key switch 41 is closed as it is when the engine is to be started or is running, current flows from the battery through resistors 142 and 143 and the voltage drop across resistor 143 forward biases transistor 141 and renders it conductive. Upon this event current flows from the battery through resistors 144 and 145. The voltage drop across resistor 144 forward biases transistor 140, thus rendering it conductive so the divider 43-46 sensing circuit has battery voltage applied and so does line 63. An advantage of this two-transistor isolating switch circuitry as compared to the single transistor 40 in the FIG. 1 embodiment is that transistor 141 is driven into saturation and thus assures that transistor 140 will stay on even through an inordinate voltage drop may be produced by heaving current consuming circuits that are supplied from key switch 141.

In FIG. 2 there are two diodes 120 and 121 and two SCRs 122 and 124 in the battery 10 charging circuit. When SCR 122 is gated on alone, battery charging current flows from alternator terminal 13 each time it becomes positive and through diode 121, battery 10, SCR 122 and through line 126 back to the presently negative terminal 14 of the alternator. Thus, the battery is charged with half-wave rectified dc when SCR 122 is gated on and SCR 124 is not conducting. When SCR 124 is also gated on, every time the output terminal 14 of the alternator goes positive for a half cycle charging current flows from terminal 14 through diode 21, battery 10, SCR 124 and line 128 back to the then negative terminal 13 of the alternator. This provides additional half-wave charging so that in totality there is full-wave rectified dc charging of the battery when both SCRs 122 and 124 are switched to a conductive state.

In the FIG. 2 embodiment of the regulator the sampled voltages at junctions 56 and 58 are set by adjusting resistor 44 as in the previously described embodiment. The voltages at junctions 56 and 58 are proportional to the voltage across battery 10 terminals when isolating transistor is conducting to divider 43-46. Zener diode 50 provides the stable reference voltage at junction point 51 to which the voltages at divider junctions 56 and 58 are compared. The proportional or sensed voltage at junction 58 of the divider is supplied to the noninverting input of a comparator 54 and the sensed voltage at junction 45 is supplied to the noninverting input of a comparator 55 as in the previously described embodiment. The zener 50 reference voltage is supplied to the inverting inputs of the comparators 54 and 55. The comparators constitute means for comparing the two different sensed voltage levels that are representative of battery voltage at junctions 56 and 58 with the zener reference voltage at junction 51.

When the voltage at junction 58 in the divider circuit drops below zener reference voltage, indicating that battery 10 needs charging, comparator 54 trips and its output 60 switches to its low impedance state wherein it can sink current. This causes a control transistor 61 to conduct as in the previously described embodiment. When transistor 61 conducts it provides a gating signal through a resistor 64 and a diode 127 to the gate terminal 123 of SCR 122, thus rendering SCR 122 conductive. A capacitor 146 and a resistor 147 filter the signal. When SCR 122 is conducting, every half ac cycle when output terminal 13 of the alternator goes positive and terminal 14 goes negative, the battery 10 is charged with half-wave rectified dc. This charging current flows from alternator output terminal through diode 121, battery 10, SCR 122 and back to the then negative terminal 14 of the alternator.

When the sensed battery voltage drops lower such that a higher charging rate should be put into effect, the voltage at divider junction 56 drops correspondingly, thus causing the output 70 of comparator 55 to switch to its low impedance state for sinking current. This causes a transistor 71 to conduct and supply a gate signal through resistor 73 and diode 132 to the gate 125 of SCR 124, thus rendering SCR 124 conductive. A capacitor 148 and resistor 149 serve as a filter circuit. When SCR 124 is conducting along with SCR 122, full-wave rectified dc charging of the battery is taking place. Now, every half ac cycle when output terminal 14 of the alternator goes positive, the battery is charged with the other half of the ac cycles so there is full-wave rectified dc charging. In other words half-wave current flows from positive terminal 14 through diode 120, battery 10 and SCR 124 and back to negative alternator terminal 13.

The tachometer supply circuit in the preferred FIG. 2 embodiment, comprised of resistor 80, transistor 82 and resistors 81, 83, 84 and 85 is structurally and functionally the same as in the FIG. 1 embodiment as previously described.

Although a preferred embodiment of the invention has been described in considerable detail, such description is intended to be illustrative rather than limiting, for the invention may be variously embodied and is to be limited only by interpretation of the claims which follow.

I claim:

1. A regulator for regulating charging of a battery from the output terminals of a source of alternating current, said regulator comprising
    first and second half-wave rectifier circuit means,
    first means for sensing a battery voltage lower than full battery voltage by a first selected amount and for generating a first control signal in response thereto,
    second means for sensing a battery voltage lower than full battery voltage by a second selected amount greater than the first selected amount and for generating a second control signal in respect thereto.
    means responsive to generation of the first control signal for connecting said first half-wave rectifier circuit means in a series circuit between the terminals of the source of alternating current and the battery so as to charge the battery with half-wave direct current and responsive to generation of the second control signal for connecting said second half-wave rectifier circuit means in another series circuit between the terminals of the source of alternating current so as to charge the battery with full-wave direct current in conjunction with said first half-wave rectifier circuit means.

2. A regulator for regulating charging of a battery from a source of alternating current including first and second terminals, said regulator comprising
    a first charging circuit including first rectifier means for conducting current from the first terminal of the source of alternating current to the positive terminal of the battery and second rectifier means for conducting the current from the negative terminal of the battery to the second terminal of the source of alternating current,
    a second charging circuit including first rectifier means for conducting current from the second terminal of the source of alternating current to the negative terminal of the battery and second rectifier means for conducting the current from the positive terminal of the battery to the first terminal of the source of alternating current.
    one of said rectifier means in each of said first and second charging circuits responsing to receipt of a control signal by switching from a nonconductive state to a conductive state,
    means for sensing a battery voltage lower than full battery voltage by a first selected amount and for generating a first control signal in response thereto,
    second means for sensing a battery voltage lower than full battery voltage by a second selected amount greater than the first selected amount and for generating a second control signal in response thereto, and
    means operative in response to generation of said first control signal for applying said first control signal to said one rectifier means in said first charging circuit so as to effect charging of the battery with half-wave dc and operative in response to generation of said second control signal for applying said second control signal to said one rectifier means in said second charging circuit so as to effect charging of the battery with full-wave dc in conjunction with battery charging operation of said first charging circuit.

3. A regulator for regulating the flow of charging current to the terminals of a battery from the output terminals of a source of alternating current, said regulator comprising
    first and second half-wave rectifier circuit means coupled to the output terminals of the alternating current source and each including control means operative to connect and disconnect the battery with the source of alternating current so as to allow or prevent flow of charging current through the battery, and a
    regulator circuit including means for supplying battery voltage thereto,
    first means for sensing a battery voltage lower than full battery voltage by a first selected amount and for generating a first control signal in respone thereto,
    second means for sensing a battery voltage lower than fully battery voltage by a second selected amount greater than the first selected amount and for generating a second control signal in response thereto,
    and means responsive to generation of said first control signal for operating said control means to connect the battery into said first rectifier circuit to thereby charge the battery with half-wave rectified dc and responsive to generation of said second control signal for operating the control means to connect the battery into said second half-wave rectifier circuit to thereby cause the battery to be charged with full-wave rectified dc.

4. A circuit for regulating the flow of charging current to the terminals of a battery, which current is supplied from the output terminals of a permanent magnet alternator, said circuit comprising a first half-wave rectifier circuit means coupled to the alternator terminals and including control means operative to connect and disconnect the battery in said first circuit means so as to allow or prevent flow of charging current through the battery, said first half-wave rectifier circuit control means including a first controlled rectifier connected between one of the alternator terminals and one of the battery terminals, said first controlled rectifier including a first gate terminal and being responsive to a signal applied thereby by switching from a nonconductive to a conductive state, a second half-wave rectifier circuit means coupled to said alternator terminals and including control means operative to connect and disconnect the battery in said second circuit means so as to allow or prevent flow of charging current through the battery, said second half-wave rectifier circuit control means including a second controlled rectifier connected between the other of the alternator terminals and the one of the battery terminals, said second controlled rectifier including a second gate terminal and being responsive to a signal applied thereto by switching from a nonconductive to a conductive state, a regulator circuit including means for supplying battery voltage thereto and including a semiconductor switch having a control element which, when provided with a control signal, renders said switch conductive to supply voltage to said regulator circuit from the battery and which, in the absence of a control signal, renders said switch nonconductive so as to isolate said regulator circuit from the battery, a switch connected between the battery and said control element and selectively operable between a connect position for supplying a control signal from the battery and a disconnect position for disconnecting the supply of the control signal, whereby disconnection of the battery causes interruption of the control signal, thereby causing said semiconductor switch to be nonconductive and thereby to disconnect the battery voltage from said regulator circuit, a zener diode connected in parallel with the battery and having a breakdown voltage greater than the fully charged battery voltage for breaking down and dissipating the alternator voltage, battery voltage sensing means, and means responsive to sensing when the battery voltage is a predetermined amount less than fully charged battery voltage by operating said control means to connect the battery into said first rectifier circuit to thereby charge the battery with half-wave rectified dc and responsive to sensing when the battery voltage is an additional amount less than said predetermined amount by operating said control means to connect the battery into said second half-wave rectifier circuit to thereby cause the battery to be charged with full-wave rectified dc.

5. A regulator for regulating the flow of charging current to a battery from the output terminals of a source of alternating current, said regulator comprising a first half-wave dc charging circuit including first rectifier means for conducting current from one of the output terminals of the alternating current source to the positive terminal of the battery and second rectifier means for conducting the current from the negative terminal of the battery back to the other of the output terminals of the alternating current source.

a second half-wave dc charging circuit including first rectifier means for conducting current from the other of said output terminals of the alternating current source to the positive terminal of the battery and second rectifier means for conducting current from the negative terminal of the battery back to the one output terminal of the alternating current source.

one of said first and second rectifier means in each of said first and second charging circuits comprising controlled rectifier means having a gate terminal and operative, in response to application to said gate terminal of a control signal, to switch from a nonconductive to a unidirectional conductive state, means for producing a stable reference voltage, means for simultaneously producing first and second voltage signals which are respectively proportional to battery voltage, first and second comparator means respectively operative to compare the first and second voltage signals with said reference voltage, said comparator means respectively responding to the occurrence of first and second voltage signals lower than said reference signal by switching to a changed output state, means responding to said first comparator means switching to the changed output state for generating a first control signal and applying said first control signal to said gate terminal of said controlled rectifier in said first rectifier circuit to thereby cause said controlled rectifier to conduct and charge the battery with dc half-waves when battery voltage is below the first battery voltage, and means responding to said second comparator means switching to the changed state for generating a second control signal and applying said second control signal to said gate terminal of said controlled rectifier in said second rectifier circuit to thereby cause said controlled rectifier in said second rectifier circuit to conduct and charge said battery with the other dc half-waves such that the battery is charged with full wave dc when battery voltage is below said second battery voltage.

6. A regulator circuit for regulating the flow of charging current to a battery from the alternating current output terminals of a permanent magnet alternator, said regulator circuit comprising a first half-wave dc charging circuit including first rectifier means for conducting current from one of the alternator output terminals to the positive terminal of the battery and second rectifier means for conducting the current from the negative terminal of the battery back to the other of the alternator output terminals, one of said first and second rectifier means comprising a first controlled rectifier means having a first gate terminal and operative, in response to a gate signal being applied to said gate terminal, to switch from a nonconductive to a unidirectional conductive state, a second half-wave dc charging circuit including first rectifier means for conducting current from the other of the alternator terminals to the positive terminal of the battery and second rectifier means for conducting current from the negative terminal of the battery back to the one alternator output terminal, one of said first and second rectifier means of said second charging circuit comprising a second controlled rectifier means having a second gate terminal and operative, in responsive to a gate signal being applied to said second gate terminal, to switch from a nonconductive to a unidirectional conductive state, and means for producing a stable reference voltage, means for simultaneously producing first and second voltage signals which respectively correspond to the battery having fallen below fully charged voltage to a first level and to a second lower level.

first and second comparator means respectively operative for comparing the first and second voltage signals with the reference voltage, said compartor means each responding to occurrence of voltage signals lower than said reference voltage by switching to a changed output state, means responsive to said first comparator means switching to the changed output state as a result of the battery voltage falling to said first level or below for providing a first gate signal to said first gate terminal to thereby cause said first controlled rectifier means to conduct and charge the battery with dc half-waves, said means for providing the first gate signal in response to said first comparator switching to the charged output state comprising a first light-emitting diode energized to emit light when said first comparator switches to the changed output state, and means responsive to said second comparator means switching to the changed output state as a result of the battery voltage falling to the second level or below for providing a second gate signal to said second gate terminal to thereby cause the said second controlled rectifier means to conduct and charge the battery with the other dc half-waves such that the battery is charged with full wave dc when its voltage is below said lower level, said means for providing the second gate signal in response to said second comparator switching to the changed state comprising a second light-emitting diode energized to emit light when said comparator switches to the changed output state.

* * * * *